July 25, 1967  HIROSHI MORI  3,332,128
APPARATUS FOR PEELING ELECTRO-DEPOSITED METALS
FROM CATHODE PLATES
Filed July 30, 1964  5 Sheets-Sheet 4

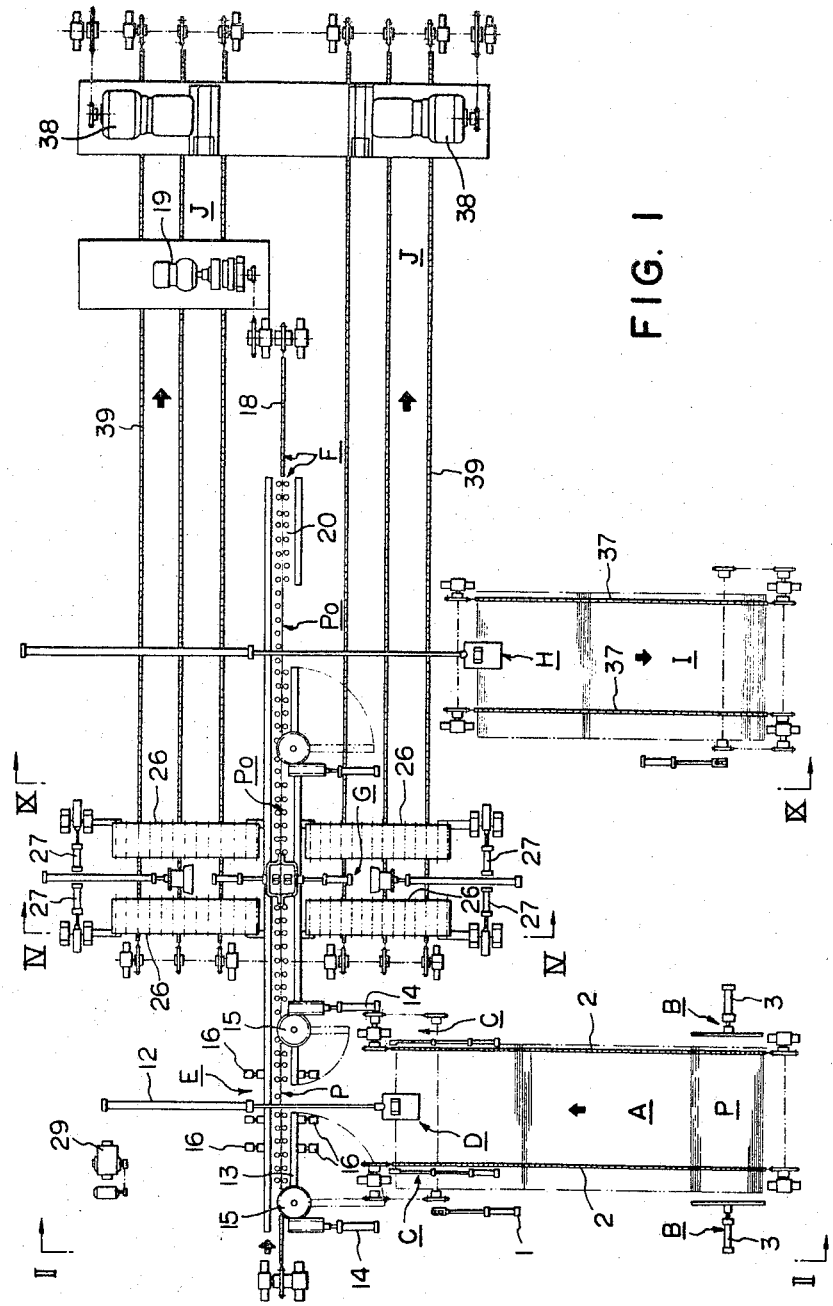

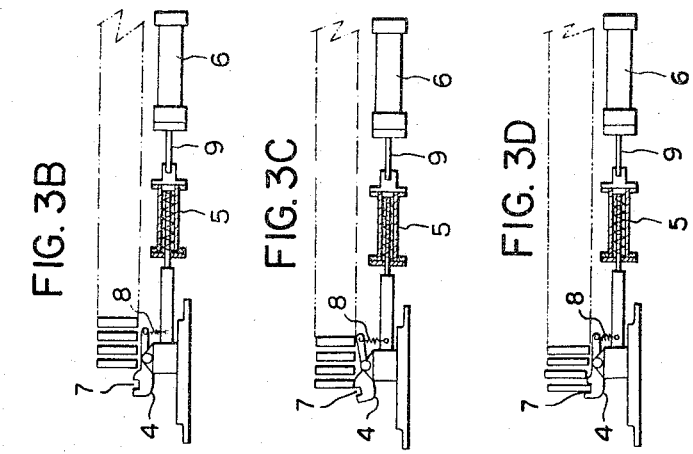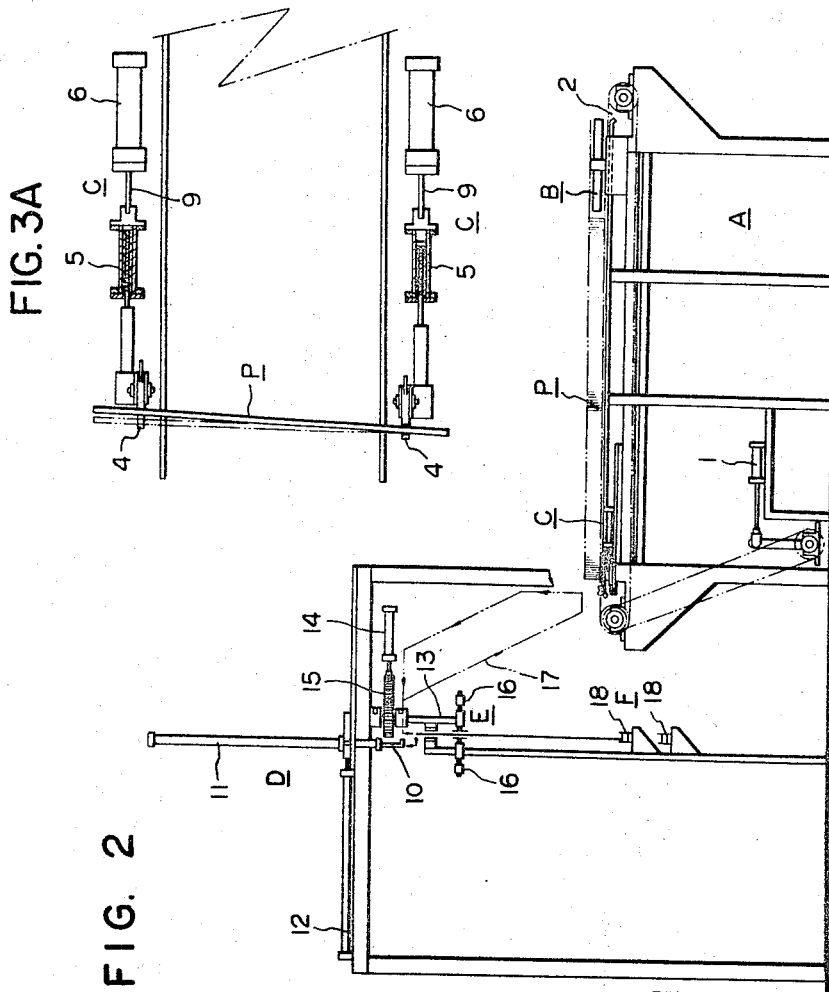

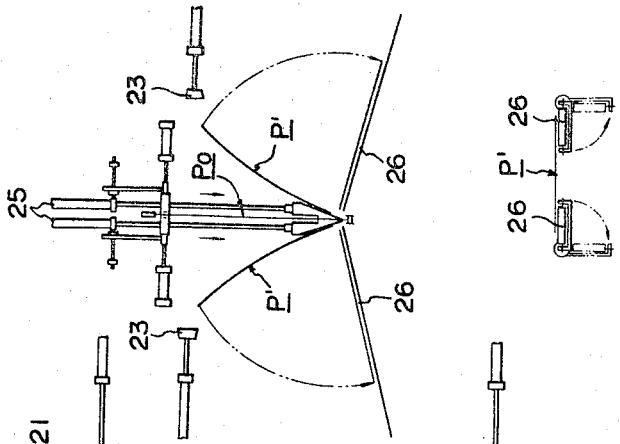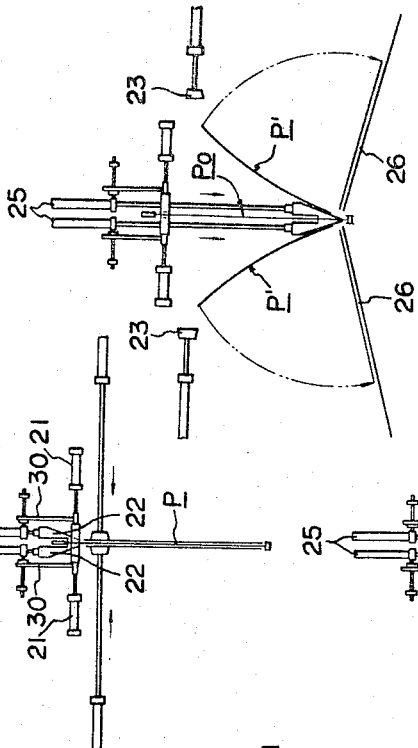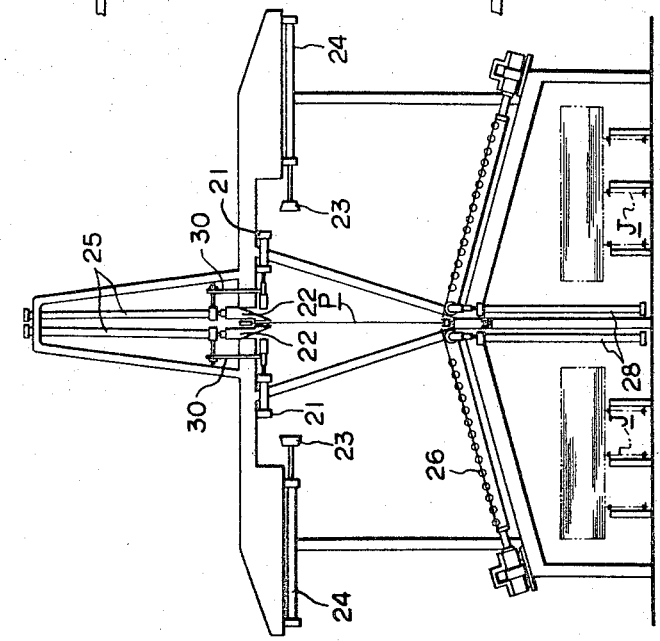

INVENTOR.
HIROSHI MORI
BY
Woodhams, Blanchard and Flynn
ATTORNEYS

United States Patent Office 3,332,128
Patented July 25, 1967

3,332,128
APPARATUS FOR PEELING ELECTRO-DEPOSITED METALS FROM CATHODE PLATES
Hiroshi Mori, Tokyo, Japan, assignor to Mitsui Mining & Smelting Co., Ltd., Tokyo, Japan, a corporation of Japan
Filed July 30, 1964, Ser. No. 386,151
Claims priority, application Japan, Apr. 18, 1964, 39/21,735
3 Claims. (Cl. 29—81)

ABSTRACT OF THE DISCLOSURE

An apparatus for peeling an electrodeposited metal layer from a cathode base plate, said apparatus consisting of a device for progressively feeding base plates having an electrodeposited metal layer into a peeling zone, a hammering device for loosening the layer, a vacuum device and, optionally, a wedge for engaging the electrodeposited metal layer and removing same from the base plate. A further portion of the apparatus provides for removing said metal layer and said base plate from the peeling zone.

---

Figure 8A:
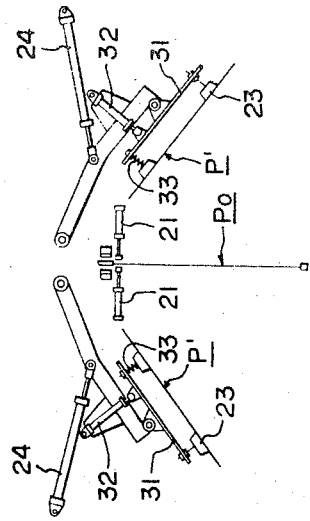

This invention relates to a new and useful apparatus for peeling electrodeposited metals from cathode plates whereby the operation is easy and the production cost is reduced. The invention more particularly relates to apparatus for peeling electrodeposited metals such as, for example, zinc and tin, from the surface of both sides of cathode base plates made of a metal, such as aluminum.

The cathode base plate of the abovementioned type is covered with a synthetic resin or the like on both side edges and the lower edge so that the electrodeposited metals on the surface of each side will be independent of the other. Previously a method of peeling such electrodeposited metals, has been adopted wherein a chisel is used for manually peeling said electrodeposited metals from the cathode plates one by one. Therefore, this has been unsatisfactory because much labor and a high production cost are required.

On the other hand, the present invention provides an apparatus for peeling electrodeposited metals from cathode plates wherein the above mentioned defect is completely eliminated. The present invention comprises a feeding and conveyer line for moving plates to a selected position. Cathode plates, each having a metal electrodeposited on either one or both surfaces thereof, are, one by one, set in a fixed position in a peeling line for peeling off said electrodeposited metals. Said peeling line is positioned at right angles to said cathode plate feeding and conveyer line, said peeling line being provided with means for hammering said cathode plates, means for peeling off said electrodeposited metals, means for conveying away the peeled electrodeposited metals and the cathode base plates separately. The aforesaid means may complete one operation within a fixed time and a flow operation may be automatically carried out. Thus, according to the apparatus of the present invention, there are the advantages that, as the electrodeposited metal is peeled off all by mechanical force, not only the operators can be relieved of hard labor but also the peeling efficiency can be increased and the production cost can be reduced and that as vacuum pads are utilized as a peeling device, not only the entire apparatus can be simplified but also the operation is easy.

Further, according to the apparatus of the present invention, in a series of steps from feeding cathode plates to peeling off the electrodeposited metals and conveying away said electrodeposited metals and the cathode base plates separately, the peeling of the electrodeposited metals is mechanized and the cost is remarkably reduced. The operation begins when the cathode plates are placed in the center position on a device for laterally feeding cathode plates from which the electrodeposited metals are to be peeled, said plates are transported to the center of the peeling device. Each component device completes one operation within a fixed time and thus a flow operation is carried out.

Thus, in order to attain the above mentioned operation, the apparatus of the present invention comprises a feeding device for feeding cathode plates which have been set in a fixed relative position in the course of feeding the plates to the peeling operation step, devices for pulling the cathode plates from said feeding device one by one and placing same in an erect position, a device for transferring the erected cathode plates to a lateral feeding device, a hammering device for striking the surfaces of the cathode plates transferred to said lateral feeding device thereby making it easy to peel the electrodeposited metals from the cathode plates, devices consisting of vacuum pads or a combination of vacuum pads and wedges for peeling the electrodeposited metals from the cathode plates, devices for conveying away the peeled deposited metals and the cathode base plates separately and delivering them.

Now, the present invention shall be more particularly explained with reference to an embodiment illustrated in the accompanying drawings. However, the present invention is not to be limited to the preferred embodiment to be described below but can be worked as properly modified in a range not deviating from the spirit mentioned in the claims attached hereto. Further, in each of the several drawings the same numerals are attached to the same corresponding parts.

Figure 8B:
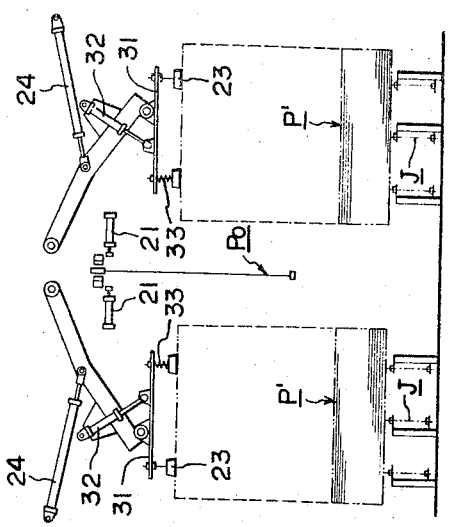
Figure 7:
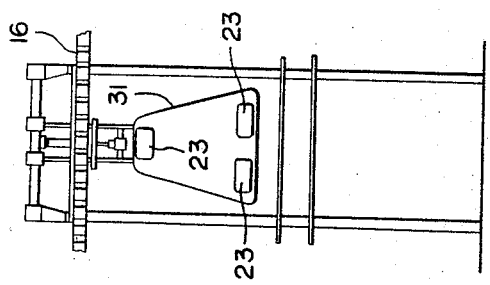
Figure 6:
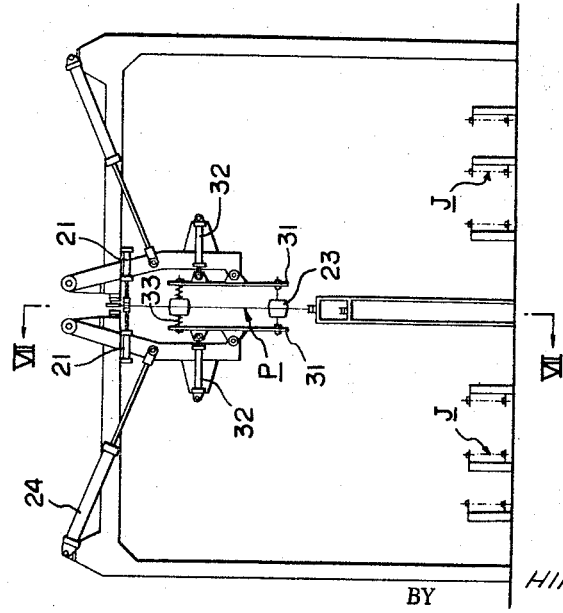
Figure 9:
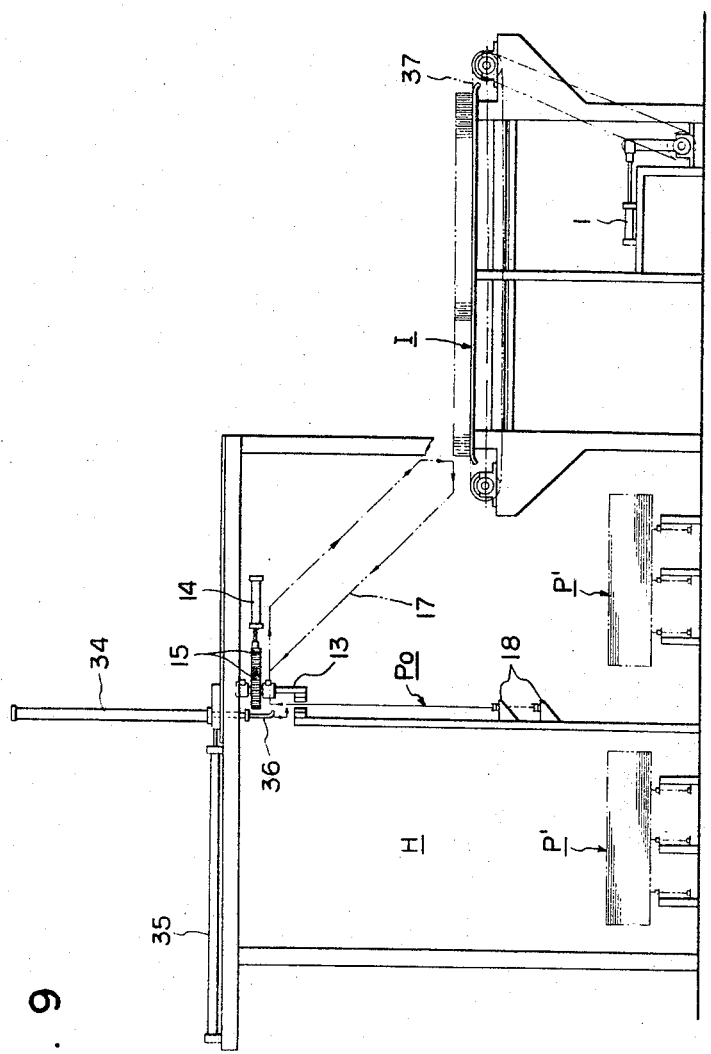

In the drawings,
FIGURE 1 is a schematic plan view of an apparatus for peeling electrodeposited metals from cathode plates according to the present invention.
FIGURE 2 is a view along the line II—II in FIGURE 1.
FIGURES 3A to D are views illustrating the construction and operation of a portion of the present invention shown in FIGURE 1.
FIGURE 4 is a sectional view taken along the line IV—IV in FIGURE 1.
FIGURES 5A to 5D are views illustrating the construction and operation of a peeling device in the above mentioned apparatus.
FIGURE 6 is a schematic side view of another embodiment of the peeling device shown in FIGURE 3.
FIGURE 7 is a sectional view taken along the line VII—VII in FIGURE 6.
FIGURES 8A and 8B are views illustrating the operation of the peeling device shown in FIGURES 6 and 7.
FIGURE 9 is a sectional view taken along the line IX—IX in FIGURE 1.

In FIGURES 1 to 9, inclusive, A is a feeding device, B is a cathode plate positioning device, C is an aligning device, D is an input conveyer device, E is a hammering device, F is a lateral feeding device, G is a peeling device, H is an output conveyer for cleaned cathode plates, I is a delivering device for cleaned cathode plates and J is an output conveyer device for discharging peeled deposited metals. A pair of the cathode plate positioning devices B are set one on each side of the front part of the feeding device A. A pair of hydraulic aligning devices C are set one on each side of the rear part of the feeding device A. The conveyer D is set in the direction of the advance of said cathode plate. Further, intersecting at right angles with the direction of the advance of said cathode plate is a line comprised of the hammering device E, the peeling device G and the lateral feeding device F in turn. In such case, the peeling devices G are arranged adjacent said line. In the same manner, the output conveyer devices J for discharging the peeled electrodeposited metals are also symmetrically arranged. One side of the next position of the above mentioned peeling devices G are set the output device H and the delivering device I.

In the feeding device A of the apparatus of the present invention formed and arranged as mentioned above and as shown in FIGURES 1 and 3, cathode plates P are placed on a roller chain conveyer 2 which is driven by an hydraulic cylinder 1. At the same time, in order to make certain the next transporting operation by fixing the relative positions of said roller chain conveyer and cathode plates, the sides of said cathode plates are engaged by positioning device B operated by the hydraulic cylinders 3. Then, the roller chain conveyer 2 is rotatably driven to feed the cathode plate P into the hydraulic aligning device C. The cathode plates P fed by the feeding device A are then positioned, one by one, in an erect position in the head part of the above mentioned feeding device by the devices C formed by connecting a hook 4 (FIGURES 3A–3D) connected to a hydraulic cylinder 6 through a spring member 5 so that the transporting device may be positively operated. In such case, as shown in FIGURE 1, the devices C are positioned on both the right and left sides of the head part of the feeding device A so that, when the cathode plate P, fed in by the feeding device A, advances pushing up the hooks 4, as shown in FIGURES 3A to D and becoming engaged in grooves 7 made in said hooks, said cathode plate is engaged by the hooks 4 through pulling springs 8 and is placed in the appropriate position by the hydraulic cylinders 6.

Further, in the above mentioned transporting step, when the cathode plate P is not at right angles to the direction of advancement of the right and left hooks 4, the first hook to engage the above mentioned cathode plate will move together with said cathode plate until said plate is engaged by the other hook and will thus extend the spring member 5. Only when both hooks 4 engage the cathode plate P will both oil pressure cylinders 6 operate simultaneously. In such case, the hook on the side of the extended spring member 5 will move together with the piston rod 9 of the hydraulic cylinder 6 only after the spring returns to the original position. Therefore, at the advance limit of said piston rod, the cathode plate P engaged by the hooks 4 will be corrected to be in a position at right angles to the direction of advancement. Needless to say, the feeding device A will automatically stop advancing when the cathode plate P is engaged by both hooks 4.

As shown in FIGURES 1 and 2, the conveying device D is formed of an elevating cylinder 11 for elevating and lowering a hook 10 for hanging cathode plates and a reciprocating cylinder 12 for advancing cathode plates. An opening and closing guide 13 is provided to prevent the cathode plate P, which has been placed on the laterally feeding device F, from overturning and is opened by the operation of a gear mechanism 15 driven by a cylinder 14 so as not to be in the way when said cathode plate is to be transferred from the feeding device A to the lateral feeding device F. The hammering device E is to give impacts with air hammers 16 to both surfaces of the cathode plate P in advance to make it easy to peel off the electrodeposited metals. One of the air hammers is fixed and the other is fitted to the opening and closing guide so that, when the operation has been completed, the piston (not illustrated) of the air hammer 16 may be certain of retreating so as not to interfere with the lateral feed of the above mentioned cathode plate. Thus, the cathode plates P on the feeding device A are transferred, one by one, to the lateral feeding device F with the hook 10 making a loop motion 17 shown by the broken line in FIGURE 2 by action of the elevating cylinder 11 and reciprocating cylinder 12. At the same time, the opening and closing guide 13, which has been open, is closed and the hammering is started.

Further, as shown in FIGURES 1 and 2, the lateral feeding device F is formed of a roller chain conveyer 18, a retarder motor 19 for driving said conveyer and guide rollers 20 for preventing said cathode plate from overturning. In such case, said retarder motor will be driven only after all of the conveying-in operation, peeling operation and conveying-out operation have been completed.

As shown in FIGURES 1 and 4 to 7, the peeling device G is formed of vacuum pads 23 for helping the peeling operation carried on by clamp cylinders 21 and wedges 22, cylinders 24 for driving said vacuum pads, wedge cylinders 25 for moving said wedges up and down, pivotally mounted roller conveyers 26 for moving the peeled electrodeposited metals to predetermined positions, rotator cylinders 27 for rotating the frames of the roller conveyers for the transfer to the electrodeposited metal discharging devices J and correcting cylinders 28. Said peeling device can be said to be a pair of mechanisms opposed to each other to simultaneously peel the electrodeposited metals off both surfaces of the cathode plate P by utilizing the wedges 22 and vacuum pads 23 as shown in FIGURES 4 and 5. Said fed cathode plate is pinched tightly in the upper part by said mechanisms.

Further, the vacuum pads 23 are connected to a vacuum pump 29. In order to make it easy to transfer the peeled electrodeposited metals to the discharging devices J, the two sets of the roller conveyers 26 are so made as to support the peeled electrodeposited metal P′ at both ends as shown in FIGURE 5D.

Now, if the cathode plate P is fed to the position of the peeling device G, said cathode plate will be held tightly in the upper part by the clamp cylinders 21 and at the same time the wedges 22 will be applied to the upper part of the cathode base plate P by the arms 30 attached to said clamp cylinders. Further, as shown in FIGURE 5A, the vacuum pads 23 will also advance into close contact with the surfaces of the peeled electrodeposited metals P′ and will apply vacuum to the surfaces through the vacuum pump 29. When a predetermined vacuum degree is reached, as shown in FIGURE 5B, the vacuum pads 23 will retreat while sucking the peeled electrodeposited metals P′. Then, as soon as each layer of electrodeposited metal P′ is peeled from the upper part of the cathode base plate Po a set distance by each vacuum pad 23, as shown in FIGURE 5C, each wedge 22 will come in between them and will peel said electrodeposited metal from the cathode base plate. Simultaneously with the operation of the wedge cylinders 25, the interiors of the vacuum pads 23 will be opened to the atmosphere and the pads will return to the retreating limits. The thus peeled electrodeposited metals P′ will move on the respective roller conveyers 26. As soon as they come to respective predetermined positions, as shown in FIGURE 5D, the right and left roller conveyers 26 will quickly rotate together with the frames and the electrodeposited layers will be transferred onto the electrodeposited metal discharging devices J.

As soon as the above operation is completed, the clamp cylinders 21 will retreat. In such case, the wedges 22 will be somewhat separated from each other by arms 30 attached to said clamp cylinders so that the movement of the cathode plate P and cathode base plate Po by the lateral feeding device F may be easy. In some cases, the cathode plates will be so irregular on the electrodeposited metal surfaces that the vacuum pads 23 will not be in sealing contact with them and the predetermined vacuum degree will not be obtained. In another case, the adhering strength between the electrodeposited metal and the cathode base plate will be so high that, even if the metal is pulled by said vacuum pad, it will not be able to be peeled off. In those cases, it may be necessary to repeat the above mentioned peeling operation several times. Further, in case the electrodeposited metals on both surfaces can not be peeled off simultaneously but the metal on one side only can be peeled off, the first peeled electrodeposited metal should be transferred to the electrodeposited metal output conveyer device J and then the peeling operation on the remaining side should be singly carried out. In such case, the vacuum pad 23 on the first peeled side will remain sucking and fixing the cathode base plate Po. Further, in case the electrodeposited metal is unable to be peeled off in the course of the peeling operation by the wedge 22, the correcting cylinder 28 will be operated to straighten the above mentioned curled electrodeposited metal so as to be easily conveyed out as an unpeelable plate by the lateral feeding device F. All of these operations are automatically carried out.

The above described peeling apparatus is to utilize both of the wedges 22 and vacuum pads 23. However, the electrodeposited metal can be peeled off also by utilizing only the vacuum pads. That is to say, as shown in FIGURES 6 to 8, such peeling apparatus is formed of clamp cylinders 21 for fixing the cathode plate P fed by the lateral feeding device F in the upper part, vacuum pads 23 for sucking the surfaces of the electrodeposited metals, cylinders 24 for driving said vacuum pads and auxiliary cylinders 32 for rotating vacuum pad fixing plates 31. The above mentioned vacuum pads are connected to a vacuum pump 29. The upper vacuum pad of the above mentioned vacuum pads is secured to the fixing plate 31 by a spring 33.

In the above mentioned formation, when the cathode plate P is transported to the predetermined position of the peeling device G, said cathode plate will be first fixed in the upper part by the clamp cylinder 21 and at the same time the vacuum pads 23 will come into close contact with the surfaces of the electrodeposited metals to be peeled off and will attach to them by vacuum. Then, when a set vacuum degree is reached, the vacuum pads 23 will retreat while remaining engaged with said electrodeposited metals and will peel off said electrodeposited metals as shown in FIGURE 8A. In such peeling off, the spring 33 of the upper vacuum pad 23 will remain compressed and the pulling force as delayed by the amount of the elongation of the spring from the lower vacuum pads will be transmitted so that the electrodeposited metal may be thereby peeled off in turn from the lower side. Now, when the vacuum pads 23 retreat, as shown in FIGURE 8B, the pistons (not illustrated) of the auxiliary cylinders 32 will advance and will place the peeled electrodeposited metals P' in horizontal positions and there the interiors of the vacuum pads 23 will be opened to the atmosphere so that electrodeposited metals may drop on the electrodeposited metal discharging device J. In case the electrodeposited metals can not be peeled from any cathode plates, the repeating operation should be the same as in the case of the peeling apparatus utilizing the wedges 22 and vacuum pads 23 in the above mentioned embodiment.

Now, as shown in FIGURES 1 and 9, the structures of the discharging device H and the delivering device I may be the same as those of the above mentioned conveyer device D and the feeding device A, respectively, except that the hammering device E is not attached to the discharging device H. The cathode base plates Po fed one by one by the laterally feeding device F are transferred to the delivering device I by a hook 36 making a loop motion due to an elevating cylinder 34 and reciprocating cylinder 35. As soon as the transfer is completed, a roller chain 37 of the delivering device I will move the width of the above mentioned cathode base plate so as to be ready for the next discharging operation. By repeating this operation, the above mentioned cathode base plates will be gradually placed in contact on the delivering device I.

As shown in FIGURES 1, 4 and 5, the peeled electrodeposited metal discharging device J is so formed that a roller chain conveyer 39 may be driven by a retarder motor 38. The electrodeposited metals P' peeled off by the device G are transferred to the above mentioned electrodeposited metal discharging device. When they reach a predetermined number, they will automatically move by a certain distance.

In the above, each of the illustrated embodiments of the apparatus of the present invention has been described. The control of the correlative operation of such embodiment within a fixed time can be so easily attained by any mechanical or electrical means that it shall not be explained herein. Further, as an example, when aluminum cathode base plates 18 mm. thick, 760 mm. wide and 950 mm. long were used, a remarkable effect was seen. In such case, said base plate was insulated on both side end edges and the lower edge.

What I claim is:

1. An apparatus for peeling electro-deposited metals from cathode plates, comprising in combination:
    a feeding device having a cathode plate positioning device for regulating the position of said cathode plates relative to said feeding device;
    an input conveyor device and an aligning device for transporting said cathode plates one at a time from said feeding device to said input conveyer device;
    a lateral feeding device for receiving said cathode plates in an erect position from said input conveyer device and for conveying said cathode plates in a direction extending at an angle to the direction of movement of said input conveyer device;
    a hammering device for loosening the electro-deposited metal on said cathode plates as said plates are supported on said lateral feeding device;
    a peeling device for removing the electro-deposited metal from said cathode plates as said plates are supported on said lateral feeding device;
    a first output conveyer device and a second output conveyer device;
    conveying means for transferring said peeled cathode plates from said lateral feeding device to said first output conveyer device and for conveying said peeled electro-deposited metal from said lateral feeding device to said second output conveyer device; and
    an output delivering device for receiving said cathode plates from said first output conveyer device and for final conveyance of said cathode plates to a point of use.

2. An apparatus as defined in claim 1, wherein:
    said lateral feeding device includes a plurality of clamping cylinders for supporting said cathode plates;
    said peeling device includes vacuum pads and cylinders for effecting reciprocating movement of said vacuum pads, whereby said vacuum pads through a pulling action remove said electro-deposited metal from said cathode plates;
    said conveying means include pivotally mounted roller conveyers, rotator cylinders for effecting pivotal movement of said roller conveyers to deposit the peeled electro-deposited metal onto said second output conveyer device; and correcting cylinders for straightening any electro-deposited metal pieces locally curled due to incomplete peeling.

3. An apparatus as defined in claim 2, wherein:

said peeling device additionally includes wedge means for peeling off the electro-deposited metal and cylinders for effecting vertical reciprocal movement of said wedge means, whereby said wedge means may be driven between said cathode plate and said electro-deposited metal.

References Cited

UNITED STATES PATENTS

| | | | |
|---|---|---|---|
| 1,525,075 | 2/1925 | Hill | 204—208 X |
| 1,535,411 | 4/1925 | Hanson | 29—81 X |
| 1,585,740 | 5/1926 | Saulia | 29—81 X |
| 1,864,490 | 6/1932 | Harrison | 204—208 |
| 1,952,762 | 3/1934 | Levy et al. | 204—216 X |
| 2,433,441 | 12/1947 | Davidoff | 204—208 X |
| 2,736,697 | 2/1956 | Vanderpool | 204—281 |

LOUIS O. MAASSEL, *Primary Examiner.*